United States Patent [19]

Murray

[11] Patent Number: 5,008,782

[45] Date of Patent: Apr. 16, 1991

[54] LIGHTED HANDLEBAR FOR BICYCLES

[76] Inventor: William D. Murray, P.O. Box 3137, Brewer, Me. 04412

[21] Appl. No.: 572,211

[22] Filed: Aug. 24, 1990

[51] Int. Cl.$^5$ .............................................. B62J 6/18
[52] U.S. Cl. ...................................... 362/72; 362/251; 362/249; 362/32
[58] Field of Search ................. 362/72, 249, 211, 251, 362/231, 811, 806, 32

[56] References Cited

U.S. PATENT DOCUMENTS

| 4,319,307 | 3/1982 | Turner | 362/72 |
| 4,337,503 | 6/1982 | Turner | 362/72 |
| 4,656,564 | 4/1987 | Felder | 362/72 |
| 4,716,502 | 12/1987 | Schott et al. | 362/72 |
| 4,819,135 | 4/1989 | Padilla et al. | 362/252 |
| 4,901,209 | 2/1990 | Nitz | 362/72 |

FOREIGN PATENT DOCUMENTS

| 125748 | 10/1947 | Australia | 362/72 |
| 1312963 | 11/1962 | France | 362/72 |
| 120044 | 10/1947 | Sweden | 362/72 |
| 147313 | 8/1931 | Switzerland | 362/72 |
| 202401 | 4/1939 | Switzerland | 362/72 |
| 614413 | 12/1948 | United Kingdom | 362/72 |

Primary Examiner—Ira S. Lazarus
Assistant Examiner—Y. Quach
Attorney, Agent, or Firm—Richard C. Litman

[57] ABSTRACT

A bicycle handlebar has numerous lamps disposed along its length. The handlebar may be transparent or partially transparent with the lamps embedded in the handlebar material. The lamps may be of different colors, and may be of the sort which flash individually. The effect is attractive and appealing to youngsters to encourage the use of the lighting system. The lamps may also be made replaceable; lamp sockets may be embedded in the handlebar material. The lamps are wired in parallel for reliability. The electric power for the lamps is supplied through jacks inserted into the handlebar near the point where the handlebar attaches to the stem of the bicycle.

17 Claims, 2 Drawing Sheets

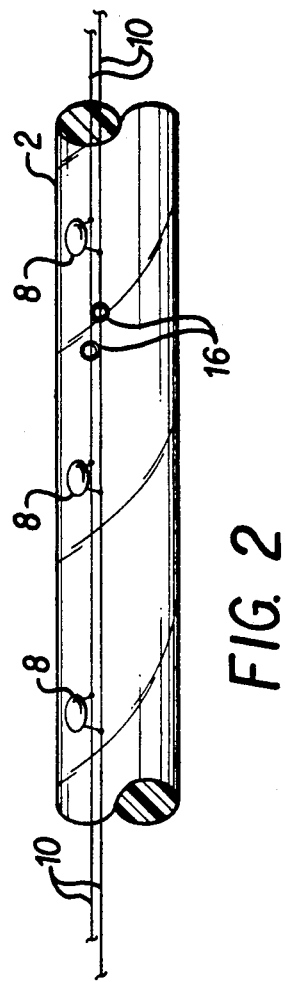
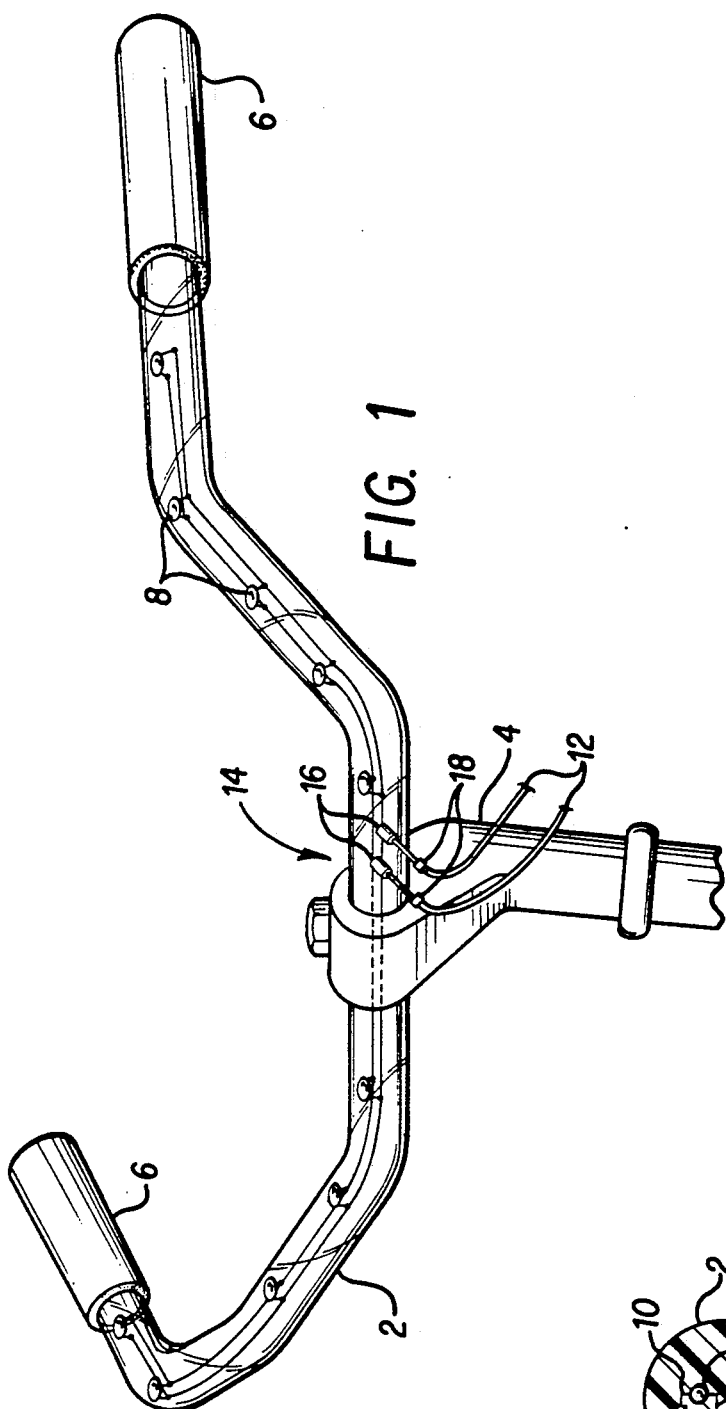
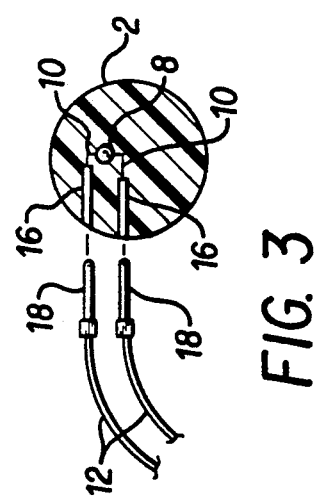

LIGHTED HANDLEBAR FOR BICYCLES

FIELD OF THE INVENTION

The present invention relates to safety equipment for riding bicycles at night. More specifically, it relates to bicycle lighting systems for night riding of bicycles.

DESCRIPTION OF THE PRIOR ART

Bicycles have been equipped with various lighting systems and reflectors for night use. Lights and reflectors are a vital safety feature since bicycles are often ridden on public streets where automobiles and trucks are also driven. Many tragedies have occurred because automobile and truck drivers have not seen a bicyclist riding on a street at night. Lights and reflectors make a bicycle much more visible and help to avoid such tragedies.

Reflectors work by sending light preferentially back in the direction it came from. This is accomplished by the reflector's incorporating many small reflecting corners whose faces are at right angles to each other. This geometry sends a ray of light back along the same line it came along. Thus, if a reflector is illuminated by the headlights of an automobile or truck, much of the light will return in the general direction of the headlights.

The bicycle is relatively far from the automobile or truck in most traffic situations. Hence the line between the eyes of the driver and the reflector, and the line between the reflector and headlights, usually form an angle that is small. This means that a larger than normal portion of the light incident on the reflector will return to the eye of the driver, making the reflector appear to glow.

Reflectors are usually red in the rear of the bicycle and white in the front. White reflectors are also commonly mounted on the spokes of a bicycle's wheels near the rim; as the wheel reflector revolves, it moves in a combination of linear and rotational motion to describe a cycloid. This motion attracts the eye of an automobile or truck driver who may be approaching the bicycle from one side.

Reflectors are also put onto pedals. If an automobile or truck is to the rear of the bicycle, these reflectors will show up as vertically moving lights.

More recently reflective tape has been fastened to the insides of bicycle wheel rims. These reflectors also show up as vertically moving lights when an automobile or truck driver is to the rear or forward of the bicycle.

While reflectors are useful, they are not as effective as lamps. A lamp will emit light by itself, and does not require that the headlights of a vehicle be aimed in the direction of the bicycle. There are many traffic situations where this could be important, as for example when the vehicle is rounding a curve and suddenly comes upon the bicycle in the roadway. In the situation described the headlights would not shine upon the bicycle, and its reflectors, until they were aimed at the bicycle just before impact.

Because of their advantages, lamps are also much used on bicycles, and are required by law in many places. Typically a red lamp is carried on the rear of the bicycle, and a white lamp is carried on the front of the bicycle. The white lamp is in most cases more useful for informing automobile and truck drivers that another vehicle is approaching than for illuminating the roadway. This is because a lamp as bright as an automobile or truck headlight consumes more power than is easily supplied.

Lamps are either battery powered, or powered by a generator which is turned by the motion of the bike. In either case the power is limited. If batteries are used, the weight of the batteries becomes a problem if much current is to be drawn for much time. If a generator is used, the power must be supplied by extra effort on the part of the bicyclist to overcome the increased drag of the generator.

One type of bicycle lamp uses a strobe lamp to conserve energy. Light is only emitted in brief pulses, so the average power used is small. However, strobe lamps are expensive and require special lamp bulbs, capacitors, and control electronics. Being complex, they are likely to break down.

Strobe lamps, and ordinary lamps, are effectively point sources of light. Often lamp bulbs are placed behind a plastic lens or cover, but these are so small that a vehicle driver gets no idea of the size or distance of a bicycle from seeing the lamp.

The bicycle lamps that have been used up to the present are utilitarian lamps which are not highly decorative. These lamps have the drawback that they do not appeal to young riders, who out of disinterest will forget or neglect to activate their lamps at night. Young riders are more in need of lamps than are older bicycle riders, because they are less experienced, less skilled, and more reckless than are older bicycle riders. Thus a bicycle lighting system that appeals to young riders would be a boon.

Lamps have generally been mounted to the bicycle frame. Felder, in U.S. Pat. No. 4,656,564 shows lamps inserted into the open ends of a bicycle handlebar of the "dropped" type which curve toward the rear. These lamps have the disadvantage of being invisible from the front of the bicycle and also of tending to be obscured by the rider's legs.

None of the above inventions and patents, taken either singly or in combination, is seen to describe the instant invention as claimed.

SUMMARY OF THE INVENTION

One object of the present invention is a bicycle lamp which is extensive in space to give an impression of the nearness of the bicycle to an automobile or truck driver.

Another object of the present invention is a bicycle lamp which employs several colors.

A further object of the present invention is a bicycle lamp which is appealing to children, who are the bicycle riders most in need of increased visibility.

Yet another object of the present invention is a bicycle lamp which flashes in complex patterns to attract attention.

These and other objects of the present invention will become readily apparent upon further review of the following specification, drawing, and claims.

Accordingly, the present invention is a bicycle handlebar with numerous lamps along its length. The handlebar may be transparent or partially transparent with the lamps embedded in the handlebar material. The lamps may be of different colors, and may be of the sort which flash individually. The effect is attractive and appealing to youngsters to encourage the use of the lighting system.

The lamps may also be made replaceable. Lamp sockets may be embedded in the handlebar material.

The lamps are wired in parallel for reliability. The electric power for the lamps is supplied through jacks inserted into the handlebar near the point where the handlebar attaches to the bicycle forks.

BRIEF DESCRIPTION OF THE DRAWINGS

FIG. 1 is an environmental perspective view of the transparent handlebar showing the embedded lamps, connectors, and wires.

FIG. 2 is a partial side elevation of a section of transparent handlebar.

FIG. 3 is a cross section of the handlebar of FIG. 2 showing the connectors and external leads.

Similar reference characters denote corresponding features consistently throughout the attached drawings.

DETAILED DESCRIPTION OF THE PREFERRED EMBODIMENTS

Figure 4:
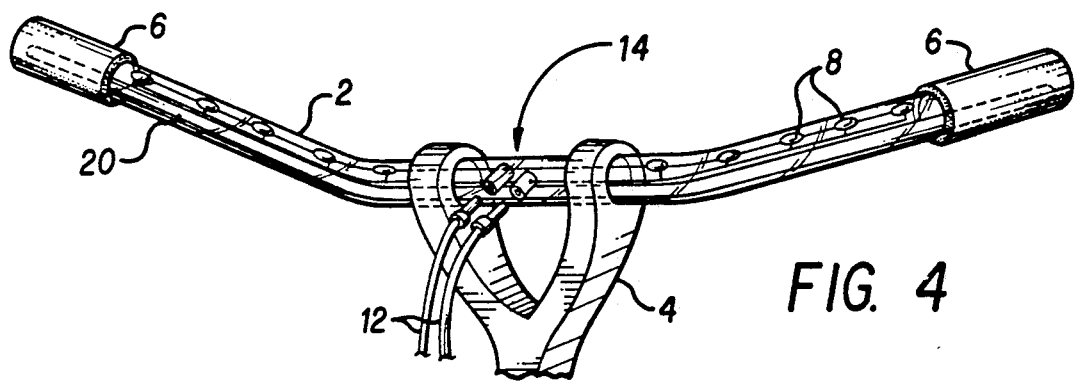
FIG. 4 shows an embodiment of the handlebar having an internal steel rod for stiffening and connectors centered for mounting on the double yoke stem shown, as on a mountain bicycle.

Referring to FIG. 1, a handlebar 2 is shown mounted on a bicycle stem 4. The handlebar 2 is covered at either end by handgrips 6. The handlebar is made of a strong but transparent (or translucent) substance like epoxy. Lamps 8 are embedded in the handlebar at various places along the length of the handlebar, except the parts covered by the handgrips 6. Electricity is supplied to the lamps 8 by internal wires 10.

The lamps are wired in parallel so that the failure of one will not extinguish the others. One of the wires 10 is negative, and one is positive.

External power leads 12 supply electric power from a battery or generator (not shown in FIG. 1). Connectors 14 electrically connect each of the leads 12 to a respective one of the wires 10. Each connector 14 consists of a jack 16 and a plug 18. The jacks 16 are flush with the rounded surface of the handlebar to permit insertion of the handlebar through the stem opening.

The large extension in space of the handlebar compared to the extension of a single lamp makes for increased visibility and also allows a vehicle driver to estimate the distance of the bicycle and rider more easily.

Referring now to FIG. 2, a section of the handlebar 2 is shown. Lamps 8 are visible through the handlebar 2. Wires 10 are shown extending beyond the ends of the handlebar section. Jacks 16 are shown positioned to connect to respective wires 10.

In FIG. 3, a cross section of the handlebar 2 is shown. In this view the connection of the jacks 16 to the wires 10 is made clear. A lamp 8 is connected between the two wires 10. Leads 12 ending in plugs 18 are in position to be inserted into the jacks 16.

FIG. 4 shows a variation on the handlebar of FIGS. 1-3. In this embodiment, a steel reinforcing rod 20 is embedded in the epoxy handlebar to strengthen it. This embodiment is preferred for strength. The rod may be made of a rigid material such as 3/8 inch steel rod. If the handlebar 2 is cast of epoxy, the rod 20 may be left in the mold with the lamps and wires and so embedded.

The embodiment of FIG. 4 also shows the connectors 14 centered along the length of the handlebar 2. This position is possible with the bifurcated type of stem 4 pictured in FIG. 4. This type of stem is sometimes found on mountain bicycles.

Figure 5:
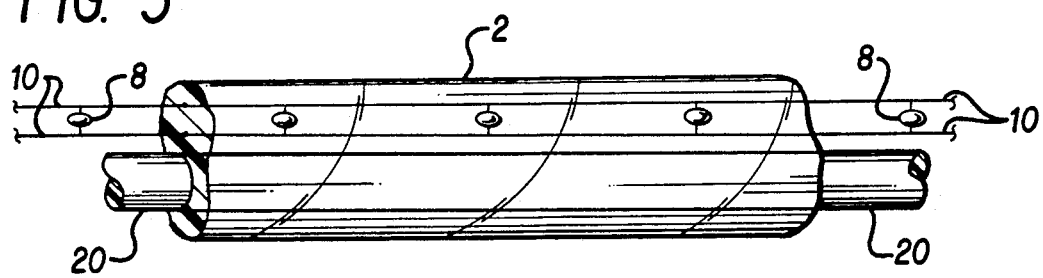
FIG. 5 is a partial side elevation of a section of transparent handlebar with internal rod.

A section of the handlebar of FIG. 4, with the embedded reinforcing rod 20 protruding at either end, is shown in FIG. 5.

Figure 6:
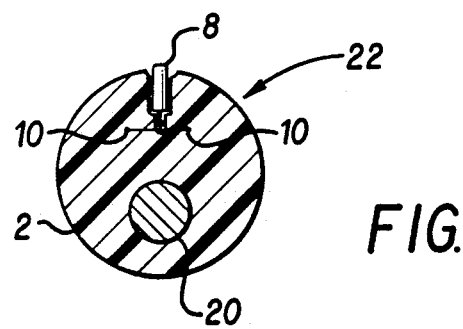
FIG. 6 is an end view cross section showing the reinforcing rod.

FIG. 6 is a cross section of the handlebar 2 again showing the rod 20. A replaceable lamp bulb 8 is shown inserted into a cavity 22. A socket 24 at the bottom of the cavity 22 accepts the replaceable bulb 8.

The lamps 8 may be ordinary white light lamps operating at any convenient voltage (the voltage would depend upon the generator or battery used). Preferably, the lamps emit colored light, or various different colors of light, to improve the appearance of the handlebar.

To make the handlebar more noticeable to automobile and truck drivers, the lamps may be of the type that flash intermittently. (Such lamps are commonly found on Christmas tree fixtures.) This flashing will attract drivers' attention even more.

The complex and changing display of colors resulting from the use of flashing colored lights will not only attract the attention of drivers, and thereby increase the safety of the riders; it will also motivate riders, especially young riders, to use the lighted handlebar of the present invention. Increasing the motivation of young riders to turn on the lamps is important in increasing safety, as no lamp is useful if it is not turned on, and youngsters are likely to forget or abjure the lamps unless motivated in some way. The appearance of the flashing colored lamps will so motivate.

It is to be understood that the present invention is not limited to the sole embodiment described above, but encompasses any and all embodiments within the scope of the following claims.

I claim:

1. A bicycle handlebar including:
    a plurality of electric lamps, each said lamp having a positive electric terminal and a negative electric terminal, said lamps so disposed along the length of said handlebar that light from said lamps may radiate away from said handlebar;
    a positive voltage connector mounted upon the surface of said handlebar for electrically connecting said lamps to an external voltage source;
    a negative voltage connector mounted upon the surface of said handlebar for electrically connecting said lamps to an external voltage source;
    conductive wires internal to said handlebar, said wires electrically connecting all of the positive terminals with said positive connector and connecting all of the negative terminals with said negative connector; whereby
    when external voltage is supplied to the connectors said lamps light.
2. A handlebar according to claim 1 wherein said handlebar is transparent, and said lamps are disposed within said handlebar.
3. A handlebar according to claim 2 including a reinforcing rod disposed within said handlebar for stiffening said handlebar.
4. A handlebar according to claim 2 wherein said lamps are replaceable.
5. A handlebar according to claim 2 wherein said connectors are flush with the surface of said handlebar.
6. A handlebar according to claim 2 wherein said lamps are adapted to flash intermittently.

7. A handlebar according to claim 6 including a reinforcing rod disposed within said handlebar for stiffening said handlebar.

8. A handlebar according to claim 6 wherein said lamps are replaceable.

9. A handlebar according to claim 6 wherein said connectors are flush with the surface of said handlebar.

10. A handlebar according to claim 2 wherein said lamps are of various colors.

11. A handlebar according to claim 10 including a reinforcing rod disposed within said handlebar for stiffening said handlebar.

12. A handlebar according to claim 10 wherein said lamps are replaceable.

13. A handlebar according to claim 10 wherein said connectors are flush with the surface of said handlebar.

14. A handlebar according to claim 10 wherein said lamps are adapted to flash intermittently.

15. A handlebar according to claim 14 including a reinforcing rod disposed within said handlebar for stiffening said handlebar.

16. A handlebar according to claim 14 wherein said lamps are replaceable.

17. A handlebar according to claim 14 wherein said connectors are flush with the surface of said handlebar.

* * * * *